March 31, 1942.  V. H. WELLS  2,277,806
HIGH INTENSITY CARBON ARC SYSTEM
Filed July 24, 1940
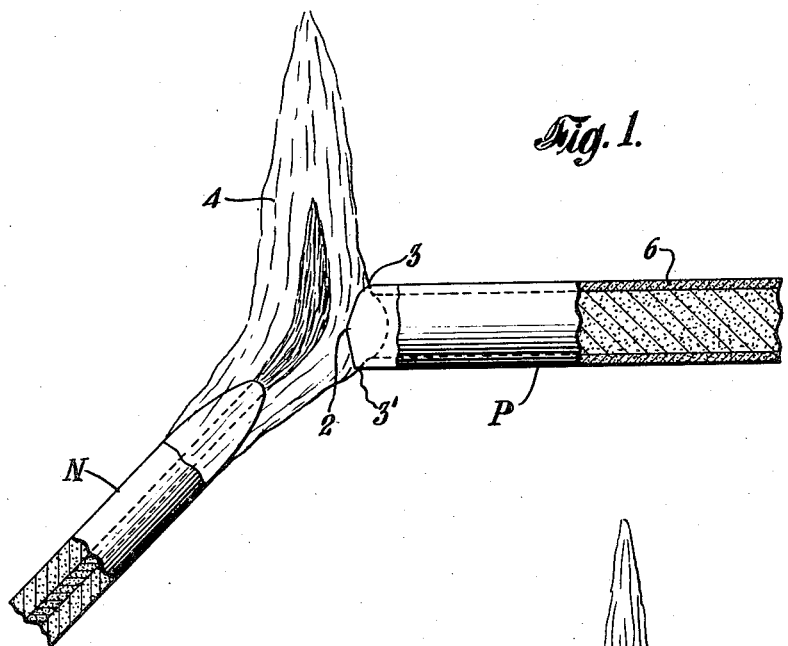
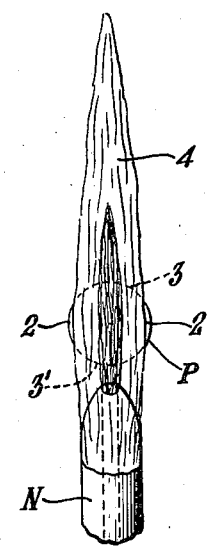
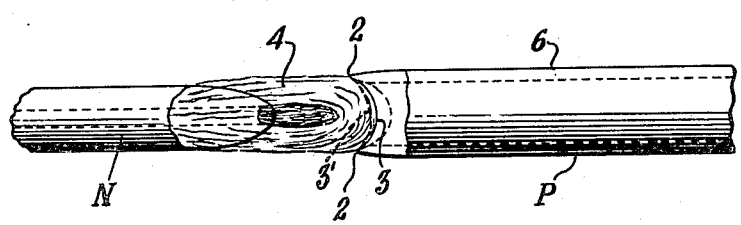
INVENTOR
VIRGIL H. WELLS
BY
ATTORNEY Patented Mar. 31, 1942

2,277,806

UNITED STATES PATENT OFFICE 2,277,806

HIGH INTENSITY CARBON ARC SYSTEM

Virgil Howard Wells, Lakewood, Ohio, assignor to National Carbon Company, Inc., a corporation of New York Application July 24, 1940, Serial No. 347,223

7 Claims. (Cl. 176—121)

The invention relates to a high intensity carbon arc system, with particular reference to a system of super high intensity characteristics, adaptable to satisfactory operation under exceptionally high arc current conditions. An improved arc operating procedure under such conditions is included.

Prior known arc systems of the high intensity type normally depend for satisfactory operation on burning conditions which will produce on the positive electrode an even faced, well formed, cup-like crater. The formation of such a crater has in fact, been generally considered an essential requisite to a steady arc performance, and to accomplish this the positive electrode is usually rotated continually while the arc is burning. Other operating conditions must also be closely controlled to insure a perfect crater development, and satisfactory arc operation is seldom attained at arc currents greater than about 225 amperes, due to the fact that the flame spreads over the sides of the crater at these higher amperages, causing a very unsteady arc.

It is an object of this invention to provide a high intensity arc system satisfactorily operable over a wider current operating range, and especially adapted to produce a steady light source at arc currents greater than about 225 amperes. A further object is to improve and simplify the arc operation under super high intensity conditions, and thereby broaden the practical field of use for such a light source.

I have found that a horizontal positive electrode can be burned without rotation with an angularly disposed negative electrode of the usual type, with exceptionally good steadiness and burning behavior at arc currents well above those usually considered practicable. Quite contrary to the burning conditions heretofore believed essential for good high intensity arc performance, there is established with this non-rotating positive trim an uneven crater formation, in which shell protrusions occur at each side of the crater, and the top and bottom portions are burned back appreciably, to present a dished appearance. With such a crater edge formation the arc flame sweeps upward between the positive shell protrusions and a quiet and very steady arc results. A high arc current, preferably in excess of 225 amperes, produces the best results, and there is indication that steady and satisfactory operation can be obtained with arc currents well over 350 amperes. Under these super high intensity conditions, that is at arc amperages more than about 225, the positive electrode will usually be of a size greater than 16 mm. in diameter, and copper coated electrodes up to 22 mm. in diameter have been tested satisfactorily at exceptionally high arc currents. For example, a 19 mm. copper coated positive electrode has been burned in this system with very steady operation at an arc current of about 300 to 325 amperes, and with larger electrodes a current of 360 amperes or higher can be carried with steadiness.

In core and shell composition electrodes similar to those of the usual high intensity type are suitable in this new arc trim. Precaution should be taken, however, that the positive carbon shell is of suitable thickness to provide the desired crater shape. Too thick a shell may produce on burning crater side protrusions of a length which will cause the arc flame to play on these protrusions rather than entirely on the crater face, and this may lead to unsteadiness. A comparatively thin shell wall is, therefore, preferred to insure the best arc behavior, and the actual shell thickness should usually be less than that of prior normal usage. For example, a present standard type of 22 mm. positive carbon electrode carries a core of 0.55 inch (about 14 mm.) diameter, and when burned in this system is not entirely steady due to side protrusions which are too long. By comparison a similar sized core in a 20 mm. and 19 mm. electrode, or even in one of 18 mm. outside diameter, provides a shell thickness producing very steady burning. This indicates that the maximum shell thickness should preferably not exceed about 0.119 inch (about 3 mm.), but since the tests mentioned are based on but one particular carbon grade, it is not the intent to establish definite limitations to these dimensions. Modifications in both shell and core composition may alter the preferred ratio of core to outside diameters, and to one skilled in the art the most suitable shell thickness to produce the desired crater side protruding portions can be readily determined.

The accompanying drawing is further illustrative of the invention, in which

Fig. 1 is a side elevation of an electrode trim embodying the invention, in partial section to show the carbon electrode structure, Fig. 2 is a top plan view of the same trim, and Fig. 3 is a front view of the trim looking toward the positive crater.

In all three figures an operating arc is represented, with a non-rotating positive carbon electrode P and a negative electrode N at an angle to the positive. The particular angular position of the negative may vary and can be similar to that employed in known high intensity arcs. Side protrusions 2 are shown on the crater in Fig. 1, and the burned back top and bottom portions 3 and 3¹ appear in Fig. 2. The arc flame 4 sweeps smoothly upward between the protrusions 2, as best shown by Fig. 3, and the relative position of the positive and negative electrode tips is controlled to provide a substantially vertical crater face, although the top crater edge 3 has a tendency to burn back slightly farther than the bottom, as indicated in Fig. 2. A comparatively thin positive electrode shell 6 produces the crater side protrusion 2 of a length suitable to confine and guide the arc flame without causing an end contact therewith. The scale of dimensions in the particular embodiment of the drawing is intended to include a copper coated positive electrode of about 19 mm. in diameter with the negative electrode substantially smaller, as is customary, and the most satisfactory arc current with such a trim is about 300 amperes.

It will be understood that many modifications are possible within the broader aspects of this invention, particularly with respect to electrode sizes, and compositions, operating arc currents, and other burning conditions, and it is the intent to include such modifications within the scope of the appended claims.

I claim:

1. A high intensity carbon arc system comprising the combination of a substantially horizontal non-rotating cored positive electrode having a relatively thin shell wall, a negative electrode in angular arc relationship therewith, and means, including a source of direct current of greater than 225 amperes in circuit with said electrodes, for producing a positive electrode crater having opposite protruding shell portions confining and guiding the arc flame.

2. A high intensity carbon arc system comprising the combination of a substantially horizontal non-rotating cored positive electrode having a diameter greater than 16 mm. and a relatively thin shell wall, a negative electrode of substantially smaller diameter than the positive electrode in angular arc relationship therewith, and means, including a source of direct current of greater than 225 amperes in circuit with said electrodes, for producing a positive electrode crater having vertically opposite protruding shell portions confining and guiding the arc flame.

3. A high intensity carbon arc system comprising the combination of a horizontal non-rotating cored positive electrode having a diameter greater than 16 mm. and a shell wall not greater than about 3 mm. thick, a negative electrode of substantially smaller diameter than the positive electrode in angular arc relationship therewith, and means, including a source of direct current of greater than 225 amperes in circuit with said electrodes, for producing a positive electrode crater having vertically opposite protruding shell portions confining and guiding the arc flame.

4. A high intensity carbon arc system comprising the combination of a horizontal non-rotating cored positive electrode having a diameter of about 18 mm. to 20 mm. and a shell wall of a thickness of about 1.8 mm. to about 3 mm., a negative electrode of substantially smaller diameter than the positive electrode in angular arc relationship therewith, and means, including a source of direct current of about 250 to 350 amperes in circuit with said electrodes, for producing a positive electrode crater having vertically opposite protruding shell portions confining and guiding the arc flame.

5. A method of producing a direct current super high intensity arc between carbon electrodes, which comprises positioning a negative electrode in angular arc relationship with a non-rotating positive electrode having a diameter greater than 16 mm., supplying current to said electrodes in excess of 225 amperes and increasing with the positive electrode size, and producing on the positive electrode a crater having opposite protruding edge portions confining and guiding the arc flame.

6. A method of producing a direct current super high intensity arc between carbon electrodes, which comprises positioning a negative electrode in angular arc relationship with a horizontal non-rotating cored positive electrode having a diameter greater than 16 mm. and a relatively thin shell, supplying current to said electrodes in excess of 225 amperes and increasing with the positive electrode size, and producing on the positive electrode a crater having vertically opposite protruding shell portions confining and guiding the arc flame.

7. A method of producing a direct current super high intensity arc between carbon electrodes, which comprises positioning a negative electrode in angular arc relationship with a horizontal non-rotating cored positive electrode having a diameter of about 18 mm. to 20 mm. and a shell wall not greater than about 3 mm. thick, supplying current to said electrodes of about 250 to 350 amperes, and producing on the positive electrode a crater having vertically opposite protruding shell portions confining and guiding the arc flame.

VIRGIL HOWARD WELLS.